Nov. 7, 1939. J. LAROCCA 2,178,691
REVERSIBLE ALTERNATING CURRENT INDUCTION MOTOR
Filed Jan. 11, 1937
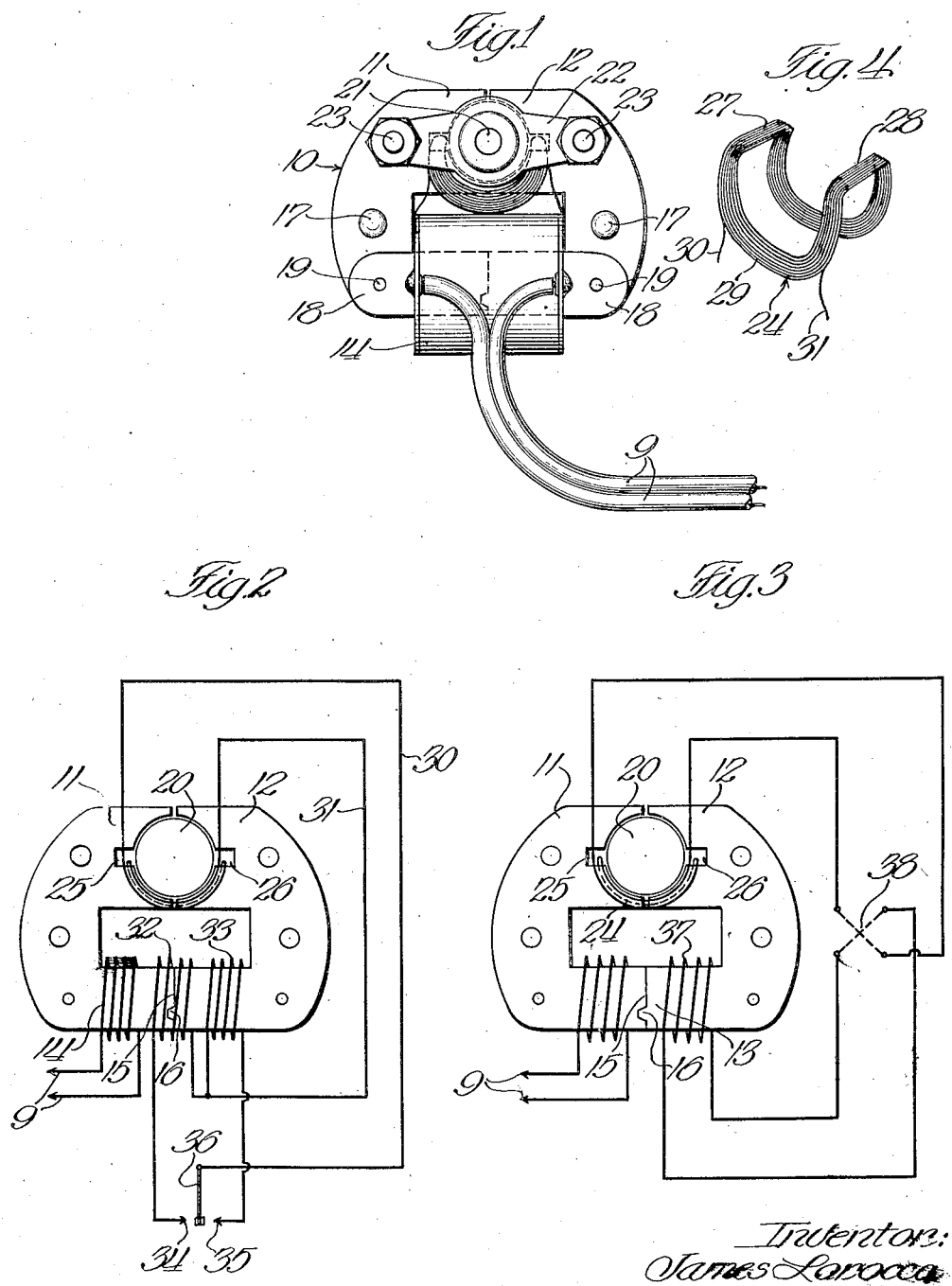

Patented Nov. 7, 1939

2,178,691

UNITED STATES PATENT OFFICE 2,178,691

REVERSIBLE ALTERNATING CURRENT INDUCTION MOTOR

James Larocca, Chicago, Ill., assignor to Speedway Manufacturing Company, Cicero, Ill., a corporation of Illinois Application January 11, 1937, Serial No. 119,943

1 Claim. (Cl. 172—278)

This invention relates to reversible alternating current induction motors and has for its principal object to provide a simple motor which may be operated as a single phase motor and can, nevertheless, be started in either direction and changed from one direction to the other.

The invention will readily be understood from the following description of preferred embodiments thereof, taken in conjunction with the accompanying drawing, in which:

Figure 1 is a side elevation of a motor embodying my invention;

Fig. 2 is a diagrammatic view showing one embodiment of the motor and the control switch therefor;

Fig. 3 is a diagrammatic view showing another embodiment of the invention and the control switch therefor, and Fig. 4 is a perspective view of the starting coil.

Referring to the drawing, the reference numeral 10 designates the magnetic structure, which is preferably built up from laminations. The magnetic structure may comprise two opposite poles 11 and 12 which are connected together by a bridge member 13 upon which the primary winding 14 is mounted. The primary winding 14 is connected to alternating current power leads 9. The form of the laminations from which the magnetic structure is built up can readily be seen in Figs. 2 and 3. The magnetic structure may be built up in two parts which are assembled in abutting relation, the line of section being indicated at 15 in Figs. 2 and 3. The laminations on the part located on the left in these figures are provided with a groove and the laminations of the right-hand part of the magnetic structure are provided with a projection 16 which enters into this groove. The laminations are secured together by rivets 17 and the two parts of the magnetic structure are secured together, after the coils are mounted on the bridge piece 13, by means of plates 18 and rivets 19. The rotor 20, which may be of squirrel-cage type, is mounted on a shaft 21. The shaft is mounted on bearing plates 22 on either side of the magnetic structure, which plates are mounted on said structure by means of bolts 23 and associated elements.

A starting coil 24, best shown in Fig. 4, is mounted in association with the two poles 11 and 12. The poles 11 and 12 are provided with transverse slots 25 and 26; that is, slots which are parallel to the axis of the shaft 21. The starting coil 24 comprises straight portions 27 and 28 which are adapted to be located within the slots 25 and 26 respectively. The side portions 29 of the coil 24 which connect the portions 27 and 28 are bent, preferably downwardly in the manner shown in the drawing in order to clear the rotor. The ends of the coil 24 are designated 30 and 31 respectively.

In the embodiment of the invention shown in Fig. 2, the bridge piece 13 of the magnetic structure 10 is provided with two secondary coils 32 and 33. The opposite ends of these coils are connected together and to the line 31. The other ends of the coils 32 and 33 are connected to contact points 34 and 35. The line 30 is connected to a pole piece 36 which is adapted to be brought into contact with either contact 34 or 35.

When alternating current is supplied to the primary winding 14 for the operation of the motor, the motor will not start until the pole piece 36 is brought into engagement with one of the contacts 34 or 35. If the pole piece 36 is brought into engagement with the contact 34, a current is induced in the circuit thus completed, this circuit including the coil 24. If, however, the arm 36 is brought into engagement with the contact 35 the coil 24 is brought into circuit with the coil 33 instead of the coil 32 and owing to the opposite direction of these two coils, the phase of the current in the coil 24 is reversed. The windings are so arranged that a change of phase exists between the winding 14 and the winding 32 or 33 and the result is, when either circuit is completed, a field is produced in the location of the rotor which has a rotary component. When the coil 32 is included in the circuit, the rotary component has one direction and when the coil 33 is included in the circuit, the rotary component has the opposite direction. It is to be noted that the motor will continue to operate after the circuit which produces the rotary component has been broken, the motor operating as a simple, single phase alternating current induction motor.

The embodiment of the invention shown in Fig. 3 differs from that shown in Fig. 2 principally in that a single secondary coil 37 is employed instead of the two coils 32 and 33. The reversal of the phase of the current in the coil 24 is obtained in this case by a reversing switch 38. This switch may be used to determine the direction in which the motor is to operate and it may or may not be opened after the motor is brought to speed, as desired.

The number of turns in the various windings should be arranged to produce a suitable phase difference between the flux of the poles and the flux produced by the coil 24. In the case of a small motor I have found that a primary winding of 1450 turns of No. 28 wire, a secondary winding with 138 turns of No. 30 wire, and a starting coil with 130 turns of No. 30 wire gives a phase difference for satisfactory starting.

Although the invention has been disclosed in connection with the specific details of preferred embodiments thereof, it must be understood that such details are not intended to be limitative of the invention except in so far as set forth in the accompanying claim.

Having thus described my invention, what I claim as new and desire to secure by Letters Patent of the United States is:

A reversible alternating current motor comprising a substantially C-shaped magnetic structure having opposite pole pieces separated by narrow air gaps, said pole pieces being bridged at opposite ends by bearing plates which are secured to each pole piece, a rotor mounted in said bearing plate in cooperating relation with said pole pieces, a primary and a secondary winding on said magnetic structure to one side of said rotor and between said pole pieces, said pole pieces being each formed with a diametrically opposite slot which extend in a common plane at right angles to the axis of said rotor, a single concentrated coil having opposite lengths thereof mounted within the slots on opposite sides of said rotor with the end turns thereof encircling the under side of said rotor to lie parallel with the ends of said magnetic structure and beneath said bearing plates, and a reversing circuit connecting said secondary winding and coil.

JAMES LAROCCA.